United States Patent
Saishu et al.

(10) Patent No.: US 7,830,579 B2
(45) Date of Patent: Nov. 9, 2010

(54) STEREOSCOPIC-IMAGE DISPLAY APPARATUS

(75) Inventors: Tatsuo Saishu, Tokyo (JP); Masako Kashiwagi, Kanagawa (JP); Ayako Takagi, Kanagawa (JP); Kazuki Taira, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 53 days.

(21) Appl. No.: 12/405,477

(22) Filed: Mar. 17, 2009

(65) Prior Publication Data

US 2009/0244682 A1 Oct. 1, 2009

(30) Foreign Application Priority Data

Mar. 28, 2008 (JP) .............................. 2008-086254

(51) Int. Cl.
*G02F 1/03* (2006.01)
*G02B 21/22* (2006.01)

(52) U.S. Cl. ........................................ 359/246; 359/376

(58) Field of Classification Search ................ 359/246, 359/376

See application file for complete search history.

(56) References Cited

U.S. PATENT DOCUMENTS

| 7,250,923 B2 | 7/2007 | Taira et al. |
| 2002/0113866 A1* | 8/2002 | Taniguchi et al. ............. 348/51 |
| 2004/0252374 A1 | 12/2004 | Saishu et al. |
| 2005/0083246 A1 | 4/2005 | Saishu et al. |
| 2005/0264881 A1 | 12/2005 | Takagi et al. |
| 2006/0256259 A1 | 11/2006 | Takagi et al. |
| 2007/0069978 A1* | 3/2007 | Daiku ........................... 345/8 |

FOREIGN PATENT DOCUMENTS

| JP | 2004-258631 | 9/2004 |
| JP | 2005-129983 | 5/2005 |
| JP | 2005-340957 | 12/2005 |
| JP | 2006-276466 | 10/2006 |
| WO | WO 03/015424 A2 | 2/2003 |

OTHER PUBLICATIONS

T. Saishu et al., "53.3: Distortion Control in a One-Dimensional Integral Imaging Autostereoscopic Display System with Parallel Optical Beam Groups," SID 04 Digest, pp. 1438-1441 (2004).
A. Takagi et al., "Stereoscopic Image Display Apparatus," U.S. Appl. No. 12/404,612, filed Mar. 16, 2009 (not yet published).

* cited by examiner

*Primary Examiner*—Jordan M. Schwartz
*Assistant Examiner*—James C Jones
(74) *Attorney, Agent, or Firm*—Finnegan, Henderson, Farabow, Garrett & Dunner, L.L.P.

(57) ABSTRACT

Mediums that are arranged opposite to an elemental-image display unit, that form two lens arrays having different principal planes together with substrates, and that switches a polarization direction of incident light corresponding to applied voltage, thereby making lens effect of either one of the lens arrays effective are included. By controlling the polarization direction synchronizing with a display timing of images to be displayed on the elemental-image display unit, the lens array to be effective is switched at each display timing, and images having different near or far direction are alternately displayed on the elemental-image display unit.

8 Claims, 11 Drawing Sheets

STEREOSCOPIC-IMAGE DISPLAY APPARATUS

CROSS-REFERENCE TO RELATED APPLICATIONS

This application is based upon and claims the benefit of priority from the prior Japanese Patent Application No. 2008-86254, filed on Mar. 28, 2008; the entire contents of which are incorporated herein by reference.

BACKGROUND OF THE INVENTION

1. Field of the Invention

The present invention relates to a stereoscopic-image display apparatus.

2. Description of the Related Art

As a stereoscopic-image display device, which is what is called a three-dimensional display, that can display a moving image, various types of devices are known. Particularly, a flat panel type not requiring special eyeglasses or the like is in increasing demand in recent years. Among stereoscopic-image display devices of this type, while it is difficult to realize full-color moving image with a type in which principles of holography are applied, with a type in which a beam control device that controls light beams from a display panel to emit toward observers is arranged right in front of the display panel (display device) whose pixel positions are fixed, such as a liquid crystal display and a plasma display of a direct view type or a projection type, it is relatively easy to realize full-color moving image.

The beam control device is generally called a parallax barrier, and controls light beams such that different images can be seen depending on a view angle even at the same position on the beam control device. Specifically, when only a right and left parallax (horizontal parallax) is given, a slit or a lenticular sheet (cylindrical lens array) is used. When an up and down parallax (vertical parallax) is additionally given, a pinhole array or a lens array is used. The systems using a parallax barrier are also classified into a two-view type, a multiview type, an ultra-multiview type (multiview system in an ultra-multiview condition), and an integral photography (hereinafter, IP). The basic principle of these types is the same as that invented about a hundred years ago and has been used for stereoscopic photograph.

The IP type has a characteristic that positions of a viewpoint is highly flexible and stereoscopic view is easily realized. With a one-dimensional IP type to which only a horizontal parallax is given without a vertical parallax, as described in "SID04 Digest 1438 (2004)", even a display device having high resolution can be realized relatively easily. On the other hand, the two-view type and the multiview type have such a problem that a range of positions of the viewpoint enabling stereoscopic view, that is, a viewing zone is narrow, making it difficult to be seen. However, the structure thereof is the simplest as a stereoscopic image display device, and a display image can be easily created.

In such direct-view naked-eye stereoscopic display devices of the IP type and the multiview type using a lenticular sheet, the resolution of a stereoscopic image, a depth range, and a viewing angle are traded off under a condition that the resolution of a display unit (elemental-image display unit) that displays an elemental image corresponding to each lens is identical. The product of these three basic performances is regarded as a comprehensive performance of stereoscopic display. As a method of doubling the comprehensive performance of stereoscopic display, a time-division multiplexing technology is known, and various methods and configurations that are classified into three types, a resolution multiplexing type, a depth multiplexing type, and a viewing zone angle multiplexing type, are known. However, as for the depth multiplexing type, such a simple configuration that is applicable to a flat panel type has not been known, and various techniques to improve the comprehensive performance of stereoscopic display have been proposed.

In JP-A 2005-129983, for example, a technique of reducing the number of a depth-fused 3-D (DFD) panel to one by using a polarization selective bifocal lens is disclosed. Moreover, in JP-A 2005-340957, a method of changing a depth range by mechanically changing a distance between lens pixels is disclosed. Furthermore, a method of switching the effectiveness of lens effect by a polarization direction by using a lens made of a refractive-index anisotropic material is disclosed in WO2003/015424, JP-A 2004-258631, and JP-A 2006-276466.

However, with the technique described in "SID04 Digest 1438 (2004)", satisfactory performance cannot be obtained for stereoscopic display of multiple parallax, and the comprehensive performance of stereoscopic display cannot be improved. Further, in the technique described in JP-A 2005-340957, the distance between lens pixels is mechanically changed, and therefore, the configuration is complicated. As a result, a switching speed high enough for the time division multiplexing cannot be achieved. Moreover, in the technique described in WO2003/015424, JP-A 2004-258631, and JP-A 2006-276466, two convex lens surfaces do not function independently, but only function as a single lens. Therefore, similarly to the above case, the comprehensive performance of stereoscopic display cannot be improved.

SUMMARY OF THE INVENTION

According to one aspect of the present invention, a stereoscopic-image display apparatus includes an elemental-image display unit that includes pixel plane on which pixels are arranged in matrix; a polarization switching cell that is arranged opposite to the elemental-image display unit, and that switches polarization direction thereof corresponding to applied voltage; a lens array lamination layer that includes refractive-index anisotropic mediums and substrates with two lens arrays whose principal planes are different from each other, the refractive-index anisotropic mediums making lens effect of either one of the lens arrays effective corresponding to the polarization direction switched by the polarization switching cell; a synchronization drive unit that controls voltage to be applied to the polarization switching cell synchronizing with a display timing of images displayed on the elemental-image display unit, and that switches the lens array to be effective at each display timing; and a display control unit that controls the elemental-image display unit to alternately display the images on near or far sides by time division multiplexing, synchronizing with the display timing, wherein focal planes of the two lens arrays are positioned at different positions from each other near the pixel plane.

According to another aspect of the present invention, a stereoscopic-image display apparatus includes an elemental-image display unit that includes pixel plane on which pixels are arranged in matrix; a first medium formed in two layers that is arranged opposite to the elemental-image display unit, the layers includes substrates with two lens arrays whose principal planes are different from each other, and the layers switches refractive index thereof corresponding to applied voltage; a second medium having isotropy that is arranged between layers of the first medium; a synchronization drive unit that controls voltage to be applied to the first medium synchronizing with a display timing of images displayed on the elemental-image display unit, and that switches the lens array to be effective at each display timing; and a display control unit that controls the elemental-image display unit to alternately display the images on near or far sides by time division multiplexing, synchronizing with the display timing, wherein focal planes of each layer of the first medium are positioned at different positions from each other near the pixel plane.

DETAILED DESCRIPTION OF THE INVENTION

Exemplary embodiments of a stereoscopic-image display apparatus according to the present invention will be explained below in detail with reference to the accompanying drawings.

Figure 1:
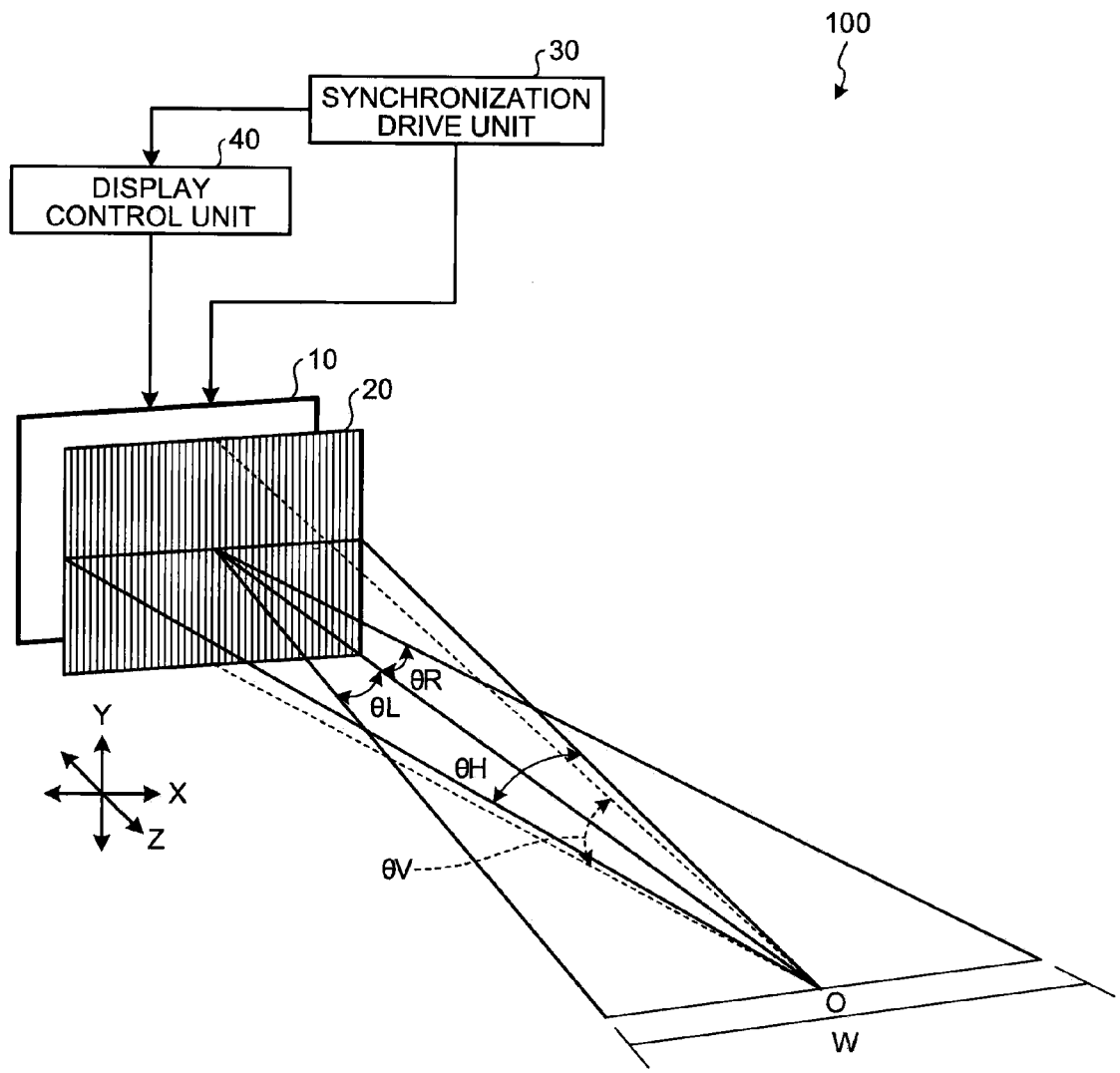
FIG. 1 is a schematic diagram illustrating a stereoscopic-image display device.

A configuration of a stereoscopic-image display apparatus 100 is explained first with reference to FIG. 1. FIG. 1 is a schematic diagram illustrating the stereoscopic-image display apparatus 100. As shown in FIG. 1, the stereoscopic-image display apparatus 100 includes an elemental-image display unit 10, a lens array unit 20, a synchronization drive unit 30, and a display control unit 40.

The elemental-image display unit 10 is a high-definition liquid-crystal panel module in which sub-pixels described later are arranged in vertical and horizontal directions in matrix. The arrangement of color filters can be of vertical stripe, horizontal stripe, or the like. The elemental-image display unit 10 can be a plasma display panel, an organic electroluminescence (EL) display panel, a field emission display panel, or the like as long as the shape of a sub-pixel opening and the color arrangement satisfy the condition described above, and the type thereof is not limited.

The lens array unit 20 is arranged at a position opposite to the elemental-image display unit 10, and is a light transmissive beam control device that gives a directivity to light beams from the elemental-image display unit 10 to emit toward an observer. In FIG. 1, an assumed position of the observer is in a range of a viewing zone width W near a position O that is apart from the center of the lens array unit 20 for a predetermined distance in a direction of the light beam (Z axis direction). By observing from a position within this viewing zone width W, a stereoscopic image can be observed near a front surface and a rear surface of the lens array unit 20 in a range of a field angle θH in a horizontal direction (X axis direction in the drawing) and a field angle θV in a vertical direction (Y axis direction in the drawing). The viewing zone width W is expressed by a right viewing zone boundary angle θR and a left viewing zone boundary angle θL when the lens array unit 20 is viewed from the position O. The viewing zone boundary angle is an angle that is formed by the position O and a boundary position from which a stereoscopic image can be recognized relative to the center of the lens array unit 20.

A configuration of the elemental-image display unit 10 and the lens array unit 20 (hereinafter, "display unit" collectively) according to a first embodiment of the present invention is explained below in detail.

Figure 2:
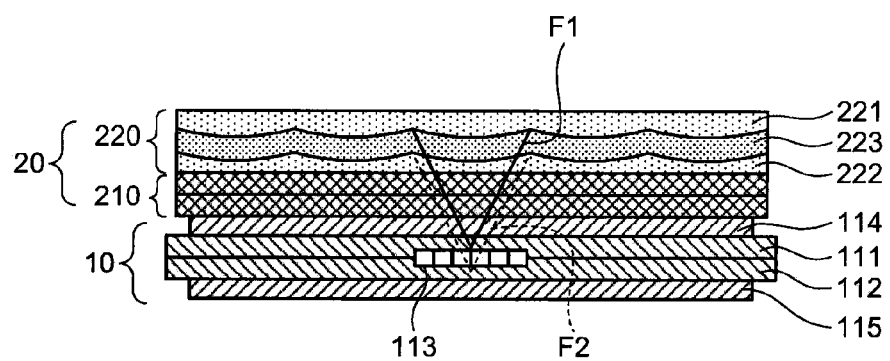
FIG. 2 is a schematic diagram illustrating a cross-section of a display unit according to a first embodiment of the present invention.

FIG. 2 is a schematic diagram illustrating a cross-section in a horizontal direction (X axis direction in FIG. 1) of the display unit according to the first embodiment. As shown in FIG. 2, the elemental-image display unit 10 includes glass substrates 111 and 112, a pixel plane 113 of a liquid crystal panel that is arranged between the glass substrates 111 and 112, and polarizers 114 and 115 that are arranged on outer surfaces of the glass substrates 111 and 112. Each pixel constituting the pixel plane 113 is constituted by sub-pixels that have three color components (red, green, blue) in at least one of a horizontal direction and a vertical direction as described later.

The lens array unit 20 includes a polarization switching cell 210 and a lens array lamination layer 220. As the polarization switching cell 210, a liquid crystal cell can be used. By applying predetermined voltage to the polarization switching cell 210 under a control of the synchronization drive unit 30, two polarization directions of light emitted to the lens array lamination layer 220 is alternately switched.

The lens array lamination layer 220 is constituted of substrates 221 and 222 and a medium 223 that is filled between the substrates 221 and 222.

The substrates 221 and 222 have curved surfaces in a form of lens array, and have refractive indexes different from each other corresponding to a refractive index of the medium 223. The form of the curved surfaces can be a fly-eye lens form or a cylindrical lens form (form of lenticular sheet). The medium 223 is a refractive-index anisotropic medium that can switch between two refractive indexes depending on a polarization direction of incident light. The medium 223 is held between the substrates 221 and 222.

Figure 3:
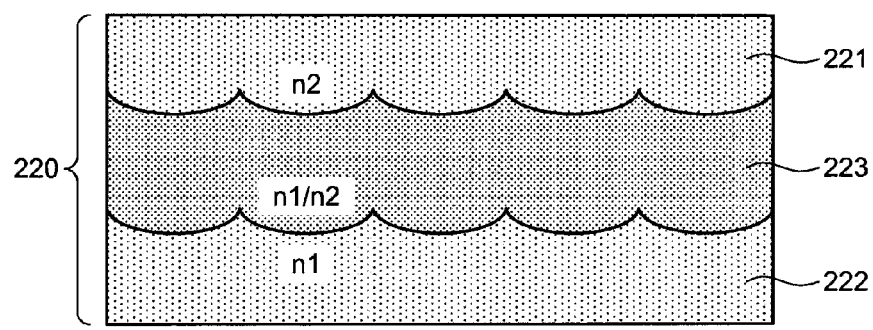
FIG. 3 is a partial enlarged view of a lens array lamination layer shown in FIG. 2.

FIG. 3 is a partial enlarged view of the lens array lamination layer 220. The medium 223 has refractive indexes n1 and n2 (n2>n1) to two polarization directions that are perpendicular to each other as the optical characteristic. Furthermore, the substrates 221 and 222 have refractive indexes substantially equivalent to each of the refractive indexes n1 and n2 of the medium 223. In the structure shown in FIG. 3, the refractive index of the substrate 221 is substantially equivalent to the refractive index n2, and the refractive index of the substrate 222 is substantially equivalent to the refractive index n1. As described above, the refractive indexes of the two substrates are substantially equivalent to the respective two refractive indexes of the medium 223. The shape and the refractive index of the substrates 221 and 222 are determined corresponding to a focus direction of the lens effect of the lens array lamination layer 220.

With such a configuration, the refractive index of the medium 223 is switched corresponding to the direction of incident light from the polarization switching cell 210 in the lens array lamination layer 220, and as a result, the lens effect of either the lens array on a side of the substrate 221 or the lens array on a side of the substrate 222 becomes effective. Since the refractive indexes n1 and n2 has an n2>n1 relation, as shown in FIG. 2, focus directions F1 and F2 of the two lens arrays of the lens array lamination layer 220 are the direction of the elemental-image display unit 10. The two lens arrays of the lens array lamination layer 220 respectively have principal planes at different positions, and are configured to have substantially the same focus distance. The focus planes are at different positions from each other near the pixel plane 113. Specifically, it is configured such that the focus plane of one (the substrate 221 side) of the lens arrays is positioned near the pixel plane 113 on the side of the glass substrate 111 (near the front surface), and the focus plane of the other (the substrate 222 side) of the lens arrays is positioned near the pixel plane 113 on the side of the glass substrate 112 (near the rear surface).

Figure 4:
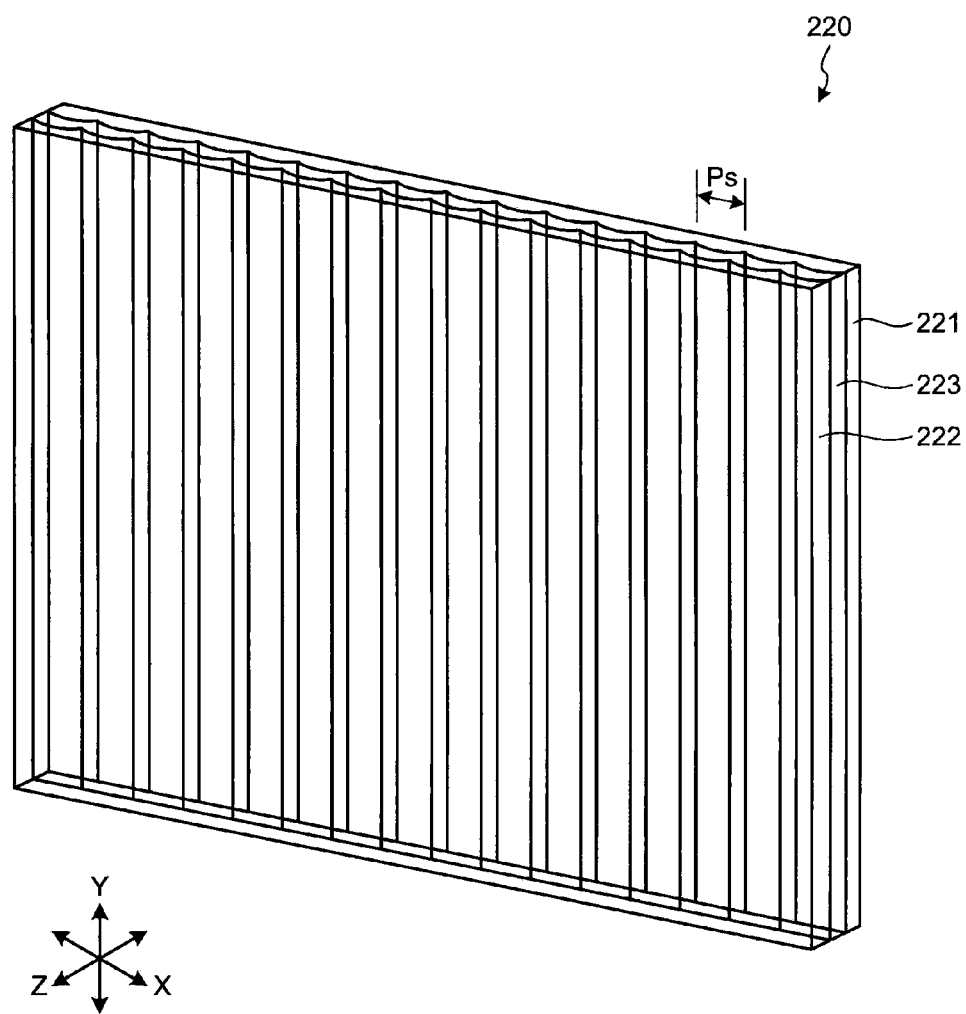
FIG. 4 is a perspective view schematically illustrating one mode of the lens array lamination layer.

The relation between the lens array lamination layer 220 and the elemental-image display unit 10 is explained below. First, the lens array of the lens array lamination layer 220 is explained with reference to FIG. 4. FIG. 4 is a perspective view schematically depicting one mode of the lens array lamination layer 220. In this example, the form of the curved surface of the substrates 221 and 222 is a cylindrical lens form. In this structure, the two lens arrays expressed by the substrates 221 and 222 have optical effect in a horizontal direction (X axis direction in the drawing). "Ps" shown in FIG. 4 indicates a horizontal pitch of the lens arrays (cylindrical lens), and is set to coincide with a direction of pixels of the elemental-image display unit 10.

Figure 5:
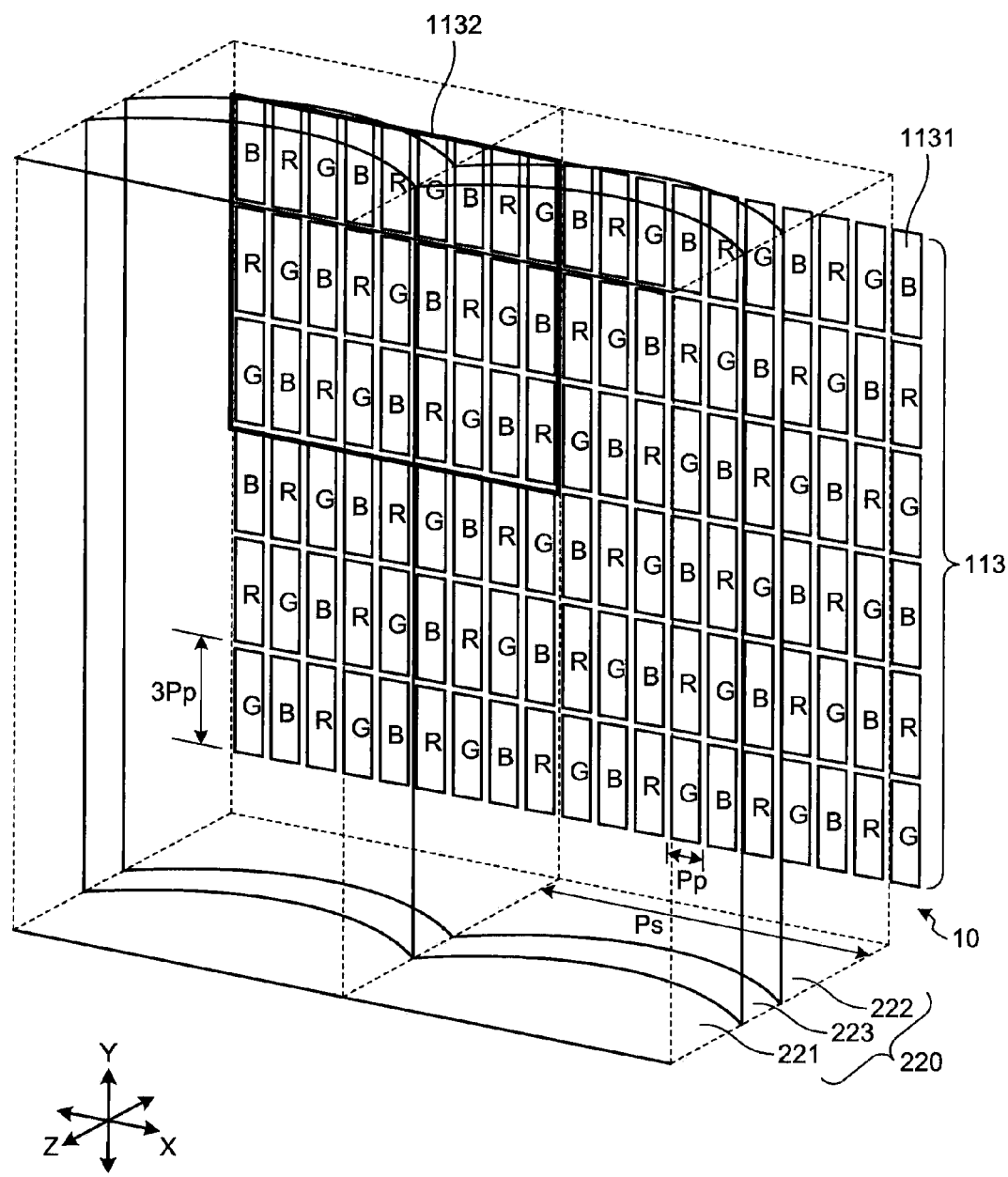
FIG. 5 is a perspective view schematically illustrating a configuration of a part of the display unit.

FIG. 5 is a perspective view schematically depicting a configuration of a part of the display unit, and an example in which the lens array lamination layer 220 shown in FIG. 4 is used is shown. In FIG. 5, illustration of the glass substrates 111 and 112, the polarizers 114 and 115, and the polarization switching cell 210 is omitted.

As shown in FIG. 5, the lens array lamination layer 220 is arranged opposite to the elemental-image display unit 10, and is formed such that the focus planes of the two lens arrays of the lens array lamination layer 220 are positioned near the pixel plane 113 (front and rear sides of the pixel plane). On the pixel plane 113, sub-pixels 1131 having an aspect ratio of 3:1 (Pp:3Pp) are arranged in matrix in the vertical direction and the horizontal direction of the elemental-image display unit 10. The sub-pixels are arranged such that red (R), green (G), and blue (B) are aligned alternately in the horizontal direction (X axis direction in the drawing) and the vertical direction (Y axis direction). This color arrangement is generally called mosaic arrangement, but the color arrangement is not limited to this example and it can be other types of arrangement such as horizontal stripe arrangement.

With a sub-pixel group corresponding to the horizontal pitch Ps of the lens array of the lens array lamination layer 220, an effective pixel 1132 (indicated by a black frame) to be each pixel at display of a stereoscopic image is formed. In FIG. 5, the effective pixel 1132 that is constituted by the sub-pixels 1131 of nine columns×three rows is shown as an example. In this case, because the effective pixel is constituted by 27 pieces of sub-pixels in total, a stereoscopic image that gives nine parallaxes in the horizontal direction can be displayed. Stereoscopic view that is displayed by the display unit is explained with reference to FIGS. 6 and 7.

Figure 6A:
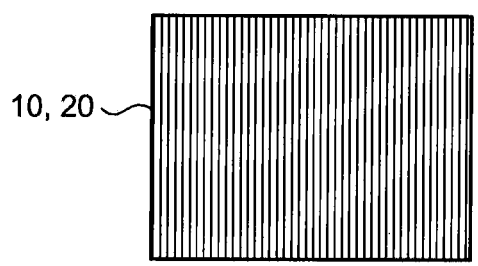
FIGS. 6A to 6C are development views schematically illustrating a configuration of a lens array and an elemental image array relative to the display unit shown in FIG. 5.
Figure 6C:
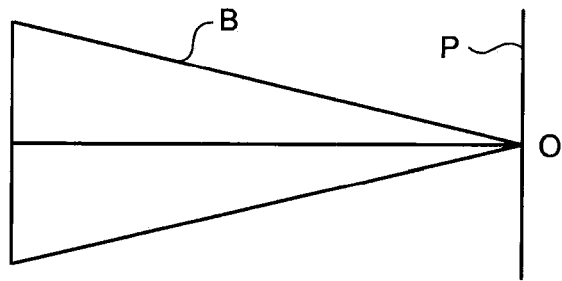
Figure 6B:
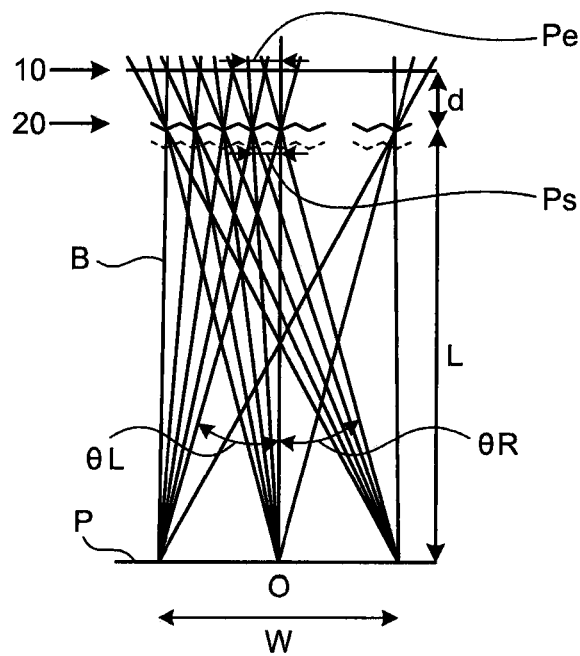

FIGS. 6A to 6C are development views schematically depicting a beam reproduction range within a vertical surface and a horizontal surface relative to the display unit shown in FIGS. 1 and 5, where FIG. 6A is a front view of the display unit (the elemental-image display unit 10 and the lens array unit 20), FIG. 6B is a plan view of an image arrangement state of the display unit, and FIG. 6C is a side view of the display unit.

In FIGS. 6A to 6C, when a view distance L between the lens array unit 20 and a view distance plane P on which the position O is present, the horizontal pitch Ps of one lens array to be the reference out of the two lens arrays of the lens array lamination layer 220, and a gap d between this lens array and the elemental-image display unit 10 (the pixel plane 113) are determined, a horizontal pitch Pe of a displayed elemental image on the pixel plane is to be determined by an interval (view distance L) at which an aperture (or lens principal point) center is projected on the pixel plane from a view point on the view distance plane P.

Reference letter B in FIGS. 6B and 6C indicates a line that connects the view position on the view distance plane P and each aperture center, and a value of the viewing zone width W is determined based on a condition that elemental images do not overlap with each other on a surface of the display unit. In the case of one-dimensional IP having a group of parallel beams, a mean value of the horizontal pitch Pe of an elemental image is a slightly larger than the integral multiple of the horizontal pitch Pp of the sub-pixel 1131, and the horizontal pitch Ps of the lens array is equal to the integral multiple of the horizontal pitch Pp of the sub-pixel 1131. In the case of the multi view type, the horizontal pitch Pe of an elemental image is equal to the integral multiple of the horizontal pitch Pp of the sub-pixel 1131, and the horizontal pitch Ps of the lens array is a slightly smaller than the integral multiple of the horizontal pitch Pp of the sub-pixel 1131.

In the first embodiment, by switching the refractive index (polarization direction) by the medium 223, two lens arrays of the lens array lamination layer 220 are used, and it is preferable that the horizontal pitch Ps of each lens array be adjusted such that respective viewing zones substantially coincide. For example, with such an arrangement that the horizontal pitch width of one on a near side (observer side) out of the substrates 221 and 222 is a little shorter than the horizontal pitch width of one on a far side, it is possible to make the viewing zones of both lens arrays substantially coincide with each other. Furthermore, while in the example shown in FIGS. 4, 5, and 6, lens in the lens array lamination layer 220 is arranged in the vertical direction (Y axis direction in the drawings), it is not limited thereto, and can be arranged in an oblique direction.

Figure 7:
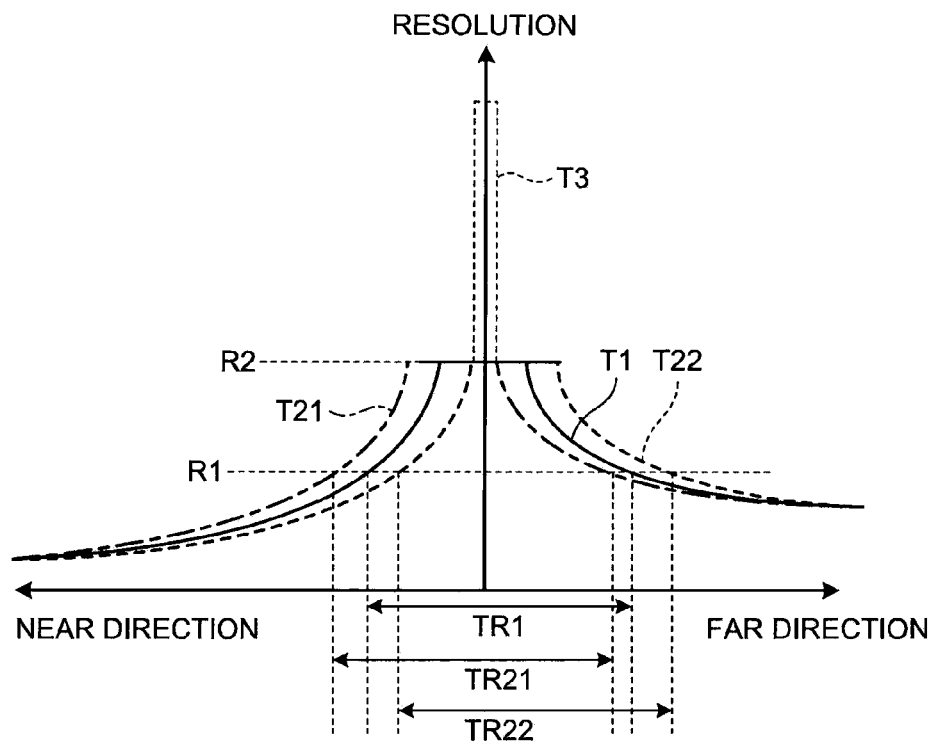
FIG. 7 is a schematic diagram illustrating a display range in a near or far direction of a stereoscopic image in the display unit.
Figure 7:
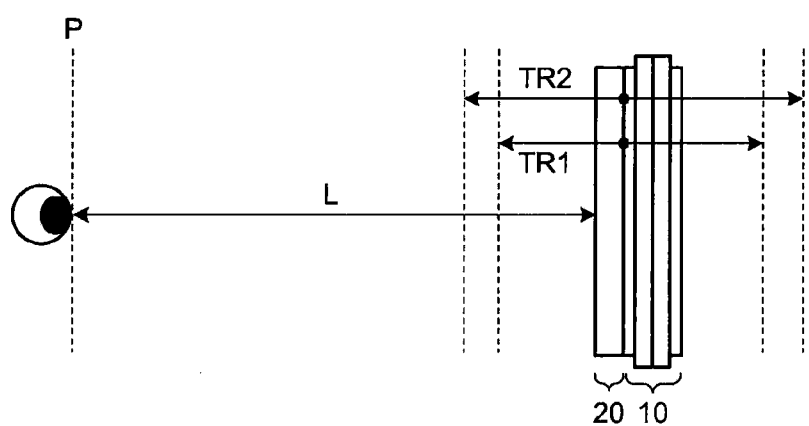

View of a stereoscopic image at the lens array lamination layer 220 described above is explained with reference to FIG. 7. FIG. 7 is a schematic diagram illustrating a display range in a near or far direction of a stereoscopic image in the display unit. In FIG. 7, an upper chart shows a change in resolution depending on a near or far display position of a stereoscopic image that is displayed by the display unit (the elemental-image display unit 10 and the lens array unit 20). Furthermore, a lower chart shows a relation between the view distance plane P described above and the display unit and corresponds to the near direction (direction of the view distance plane P) and the far direction (direction opposite to the view distance plane P) in the upper chart relative to the position at which the display unit is arranged.

When a single lens array is used, a characteristic curve T that expresses a change of resolution depending on the depth position of an object to be stereoscopically displayed is as indicated by T1. In this case, if a range that satisfies a minimum resolution R1 that enables to recognize the object as a three dimensional object is calculated for the near or far display position, a range TR1 that is present in front and behind the stereoscopic-image display apparatus 100 is acquired.

On the other hand, in the configuration of the first embodiment, two lens arrays having different focal planes are used, and therefore, if the focal plane of one of the lens arrays is present on the side of the view distance plane P near the pixel plane 113 of the elemental-image display unit 10, that is, on the front side of the pixel plane 113, the characteristic curve that expresses a change of resolution depending on the near or far display position of an object to be stereoscopically displayed is expressed as T21. Moreover, when the focal plane is shifted to the rear side of the pixel plane 113 as a result of switching the lens array to the other lens array, the characteristic curve that expresses a change of resolution depending on the near or far display position of an object to be stereoscopically displayed is expressed as T22. Therefore, with the configuration of the first embodiment, the range that satisfies the resolution R1 for the near or far display position is a range TR21 and a range TR22, respectively. Resolution (for example, resolution R2) other than the resolution R1 is also similar to the resolution R1.

Referring back to FIG. 1, the synchronization drive unit 30 controls the polarization switching cell 210, synchronizing with a display timing for an image for stereoscopic display (hereinafter, "stereoscopic display image").

Specifically, the synchronization drive unit 30 alternately switches values of voltage to be applied to the polarization switching cell 210 synchronizing with each field obtained by dividing one frame of the stereoscopic display image into two, thereby switching the polarization direction of incident light to the medium 223 alternately to switch two lens states (lens arrays) of the lens array lamination layer 220 every ½ frame period (1 field period). While in the first embodiment, the effective lens array is switched every 1 field, it is not limited thereto, and the lens array can be switched every one frame period, for example.

The display control unit 40 controls the elemental-image display unit 10 to display the stereoscopic display images having different depth ranges alternately by the time division multiplexing, synchronizing with a voltage switching timing of the synchronization drive unit 30, that is, a ½ frame period (1 filed period). The depth range of a stereoscopic display image to be displayed in each field is the range on the near side in a field (TR21) in which the lens array on the near side is effective, and the range on the far side in a field (TR22) in which the lens array on the depth side is effective.

Figure 8:
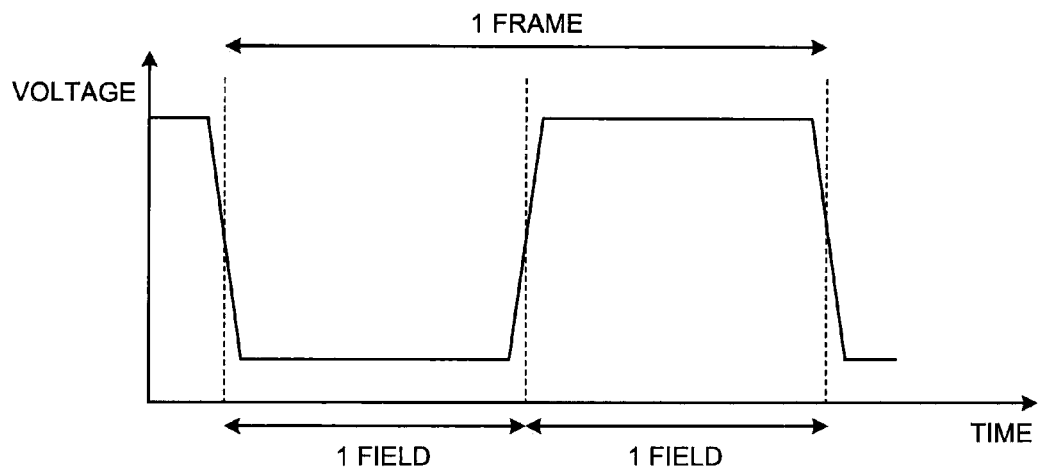
FIG. 8 is a chart of a relation between a waveform of voltage applied to a polarization switching cell and a display timing of a stereoscopic display image.

FIG. 8 is a chart of a relation between a waveform of voltage applied to the polarization switching cell 210 and a display timing of a stereoscopic display image that is displayed on the elemental-image display unit 10. In the chart, a horizontal axis indicates time, and a vertical axis indicates voltage. Furthermore, a waveform of voltage applied to the polarization switching cell 210 is shown with a sold line, and the display timing of an image by the display control unit 40 is shown with a broken line.

The synchronization drive unit 30 alternately switches the lens effect of the two lens arrays of the lens array lamination layer 220 every one field by applying voltage in the voltage waveform shown in FIG. 8 to the polarization switching cell 210, synchronizing with two fields that are obtained by dividing one frame of a stereoscopic display image to be displayed on the elemental-image display unit 10 into two. Moreover, the synchronization drive unit 30 causes the display control unit 40 to alternately display stereoscopic display images having different depth ranges every one field.

In this way, the switch of effective lens array is performed synchronizing with the display timing on the elemental-image display unit 10, and therefore, the range that satisfies the resolution R1 can be the range that is covered by the range TR21 and the range TR22 shown in FIG. 7, that is, equivalent to the range TR2. Therefore, the display range in the near direction and the far direction can be increased compared with a case that a single lens array is used.

As described above, in the first embodiment, two lens arrays having different focal planes are implemented using a refractive-index anisotropic medium, and the elemental-image display unit is caused to display near or far side images alternately by the time division multiplexing synchronized with the switching timing of the lens arrays. Thus, the display range in the near direction and the far direction can be increased, and as a result, the comprehensive performance of a stereoscopic image can be improved with a simple configuration.

While in the first embodiment, the curved surfaces of lenses of the substrates 221 and 222 are arranged to be convex relative to the elemental-image display unit 10 as shown in FIGS. 2 and 3, it is not limited thereto.

Figure 9:
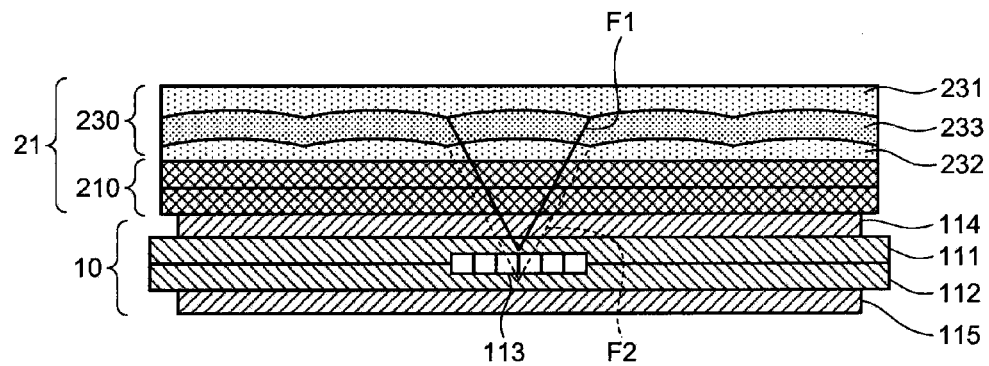
FIG. 9 is a schematic diagram illustrating a cross-section of a display unit according to a modification of the first embodiment.

For example, as shown in FIG. 9, substrates 231 and 232 that correspond to the substrates 221 and 222 described above can be arranged to have concave surfaces relative to the elemental-image display unit 10. A medium 233 is a refractive-index anisotropic medium that corresponds to the medium 223 described above, and is held between the substrates 231 and 232 having curved shapes in a form of lens array. A lens array lamination layer 230 includes the substrates 231 and 232 and the medium 233, and constitutes a lens array unit 21, which corresponds to the lens array unit 20, with a polarization switching cell 210. With such a configuration, similarly to the lens array lamination layer 220, in the lens array lamination layer 230, either a lens array on the side of the substrate 231 or a lens array on the side of the substrate 232 is effective corresponding to voltage applied to the polarization switching cell 210.

If the refractive indexes in two states of the medium 233 are n1/n2 (n2>n1), and if the refractive index of the substrate 231 is n1 and the refractive index of the substrate 232 is n2 corresponding to the medium 233 similarly to the above, as shown in FIG. 9, the focus directions F1 and F2 of the two lens arrays of the lens array lamination layer 230 are the direction of the elemental-image display unit 10. The two lens arrays of the lens array lamination layer 230 respectively have principal planes at different positions, but are configured to have substantially the same focus distance. The focal planes thereof are present near the front and the rear surfaces of the pixel plane 113 similarly to the above.

By configuring the display unit as described above, similarly to the first embodiment, and by performing the switch of the lens array to be effective and the display of a stereoscopic display image by the synchronization drive unit 30 and the display control unit 40, the display range in the near and the far directions are increased. Therefore, the comprehensive performance of stereoscopic image can be improved by a simple configuration.

Figure 10:
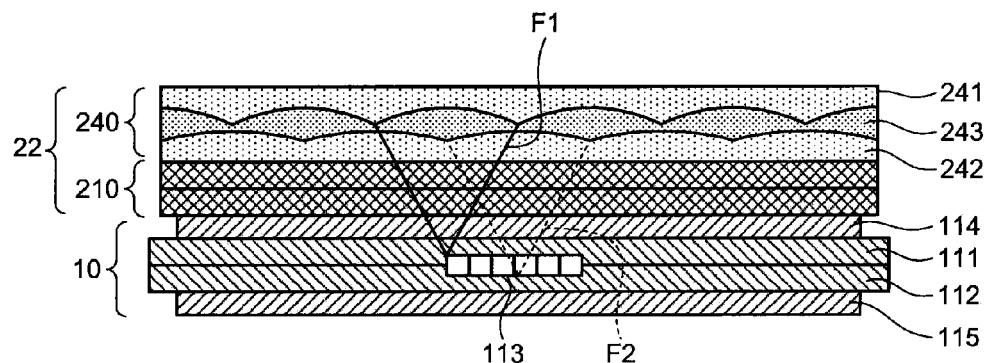
FIG. 10 is a schematic diagram illustrating a cross-section of a display unit according to another modification of the first embodiment.

FIG. 10 is a schematic diagram illustrating another modification according to the first embodiment. As shown in FIG. 10, a lens array unit 22 corresponding to the lens array unit 20 includes the polarization switching cell 210 and a lens array lamination layer 240. The lens array lamination layer 240 is constituted by substrates 241 and 242 corresponding to the substrates 221 and 222 described above, and a refractive-index anisotropic medium 243 corresponding to the medium 223. In the lens array lamination layer 240, similarly to the lens array lamination layer 220, lens effect of either a lens array on the side of the substrate 241 or a lens array on the side of the substrate 242 is effective corresponding to voltage applied to the polarization switching cell 210.

Figure 11:
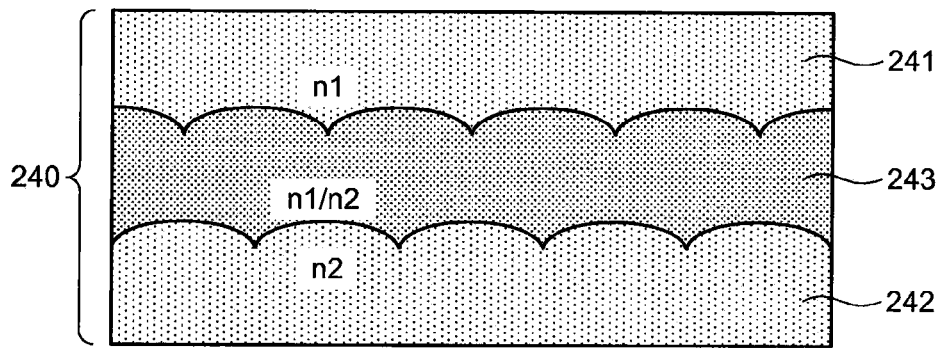
FIG. 11 is a partial enlarged view of a lens array lamination layer shown in FIG. 10.

The present modification differs in the configuration from the example shown in FIGS. 2 and 9, phases of the substrates 241 and 242 are shifted by a predetermined amount (for example, a half pitch of the lens) in the direction toward the inside of the lens. FIG. 11 is a partial enlarged view of the lens array lamination layer 240.

If the refractive indexes in two states of the medium 243 are n1/n2 (n2>n1), and if the refractive index of the substrate 241 is n1 and the refractive index of the substrate 242 is n2 corresponding to the medium 243 similarly to the above, as shown in FIG. 10, the focus directions F1 and F2 of the two lens arrays of the lens array lamination layer 240 are the direction of the elemental-image display unit 10. The two lens arrays of the lens array lamination layer 240 respectively have principal planes at different positions, but are configured to have substantially the same focus distance. The focal planes thereof are present near the front and the rear surfaces of the pixel plane 113 similarly to the above.

If configured as shown in FIGS. 10 and 11, similarly to the first embodiment described above, by performing the switch of the lens array to be effective and the display of a stereoscopic display image by the synchronization drive unit 30 and the display control unit 40, not only the display range increases to the range TR2, but also the resolution thereof shows a resolution curve indicated by T3 shown in FIG. 7. As described above, by applying this configuration, the resolution of an overlapped part in the pop-up and the depth directions can be increased. Therefore, the comprehensive performance of stereoscopic image can be improved by a simple configuration.

A second embodiment of the present invention is explained next. In the first embodiment described above, a configuration in which two lens arrays having different focal planes are implemented by using a single refractive-index anisotropic medium has been explained. In the second embodiment, a configuration example in which two lens arrays are implemented by using two refractive-index anisotropic mediums is explained. Like reference numerals or letters are denoted to like constituent elements in the first embodiment, and explanations thereof will be suitably omitted.

Figure 12:
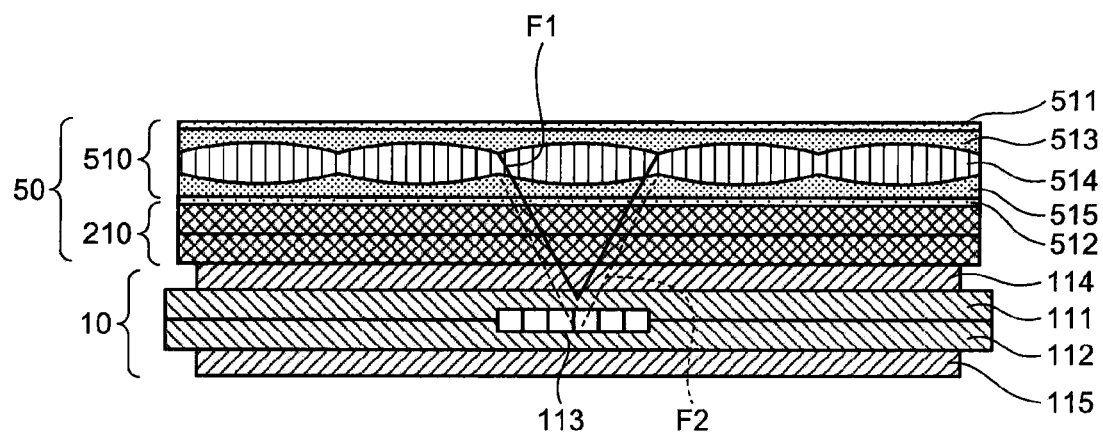
FIG. 12 is a schematic diagram illustrating a cross-section of a display unit according to a second embodiment of the present invention.

FIG. 12 is a schematic diagram illustrating a cross-section of a display unit according to the second embodiment. As shown in FIG. 12, a lens array unit 50 includes the polarization switching cell 210 and a lens array lamination layer 510. The lens array lamination layer 510 is constituted by substrates 511 and 512 and mediums 513, 514, and 515 in three layers that contact on two interfaces that form curved surfaces of a lens. The form of the curved surfaces of the lens can be a fly-eye lens form or a cylindrical lens form (form of lenticular sheet).

Figure 13:
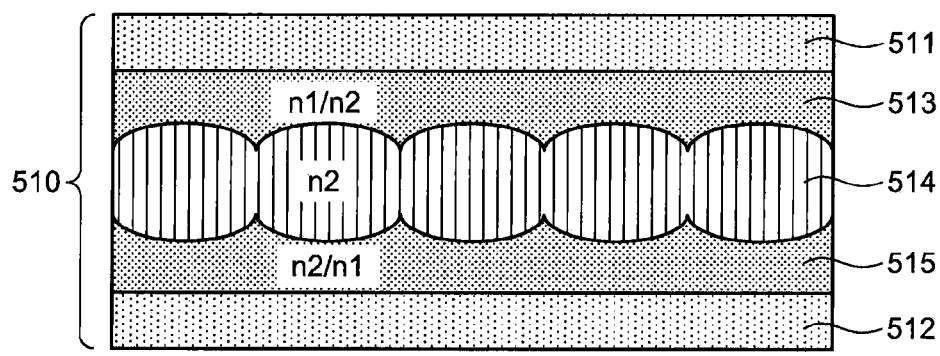
FIG. 13 is a partial enlarged view of a lens array lamination layer shown in FIG. 12.

FIG. 13 is a partial enlarged view of the lens array lamination layer 510. As shown in FIG. 13, the mediums 513 and 515 are arranged such that convex curved surfaces of the lens are opposite to each other, and the medium 514 is sandwiched between the mediums 513 and 515. The mediums 513 and 515 are a refractive-index anisotropic medium in which the refractive index changes corresponding to the polarization direction of incident light. The medium 514 is an isotropic medium whose refractive index is fixed having curved shapes in a lens array that forms interfaces (curved surfaces of lens) of the mediums 513 and 515.

The medium 513 and 515 have refractive indexes n1 and n2 to two polarization directions that are perpendicular to each other as the optical characteristic, and show refractive indexes different from each other to the same polarization direction, that is, the mediums 513 and 515 have a relation that refractive-index anisotropic axes thereof are orthogonal to each other. Moreover, the medium 514 has a refractive index substantially the same as one of the refractive indexes common for the two mediums 513 and 515. In the example shown in FIG. 13, the medium 514 has the refractive index n2. As described above, the refractive index of the medium 514 is substantially identical to one of the refractive indexes common for the two mediums 513 and 515. The shape and the refractive index of the medium 514 are determined according to the focus direction of the lens effect of the lens array lamination layer 510.

Thus, as shown in FIG. 12, the focus directions F1 and F2 of the two lens arrays of the lens array lamination layer 510 are the direction of the elemental-image display unit 10. The two lens arrays of the lens array lamination layer 510 respectively have principal planes at different positions, but are configured to have substantially the same focus distance. The focal planes thereof are present near the front and the rear surfaces of the pixel plane 113 similarly to the above.

With such a configuration, the polarization direction of incident light to the mediums 513 and 515 is switched corresponding to voltage applied to the polarization switching cell 210, and as a result, the lens effect of either the lens array on a side of the mediums 513 or the lens array on a side of the mediums 515 becomes effective. Since the substrates 511 and 512 are in a flat shape, it is not necessary to consider the refractive index thereof.

In the second embodiment, the synchronization drive unit 30 alternately switches values of voltage to be applied to the polarization switching cell 210 synchronizing with each field obtained by dividing one frame of the stereoscopic display image to be displayed on the elemental-image display unit 10 into two similarly to the first embodiment described above, thereby alternately switching lens states of the lens array lamination layer 510, that is, a lens array to be effective. The display control unit 40 controls the elemental-image display unit 10 to display the stereoscopic display images having different depth ranges alternately by the time division multiplexing in each field. The depth range of a stereoscopic display image to be displayed in each field is the range on the near side in a field in which the lens array on the near side is effective, and the range on the depth side in a field in which the lens array on the depth side is effective.

As described above, in the second embodiment, two lens arrays having different focal planes are implemented by using two refractive-index anisotropic mediums, and images on the near or far side are alternately displayed on the elemental-image display unit by time division multiplexing synchronized with the lens array switching timing. Thus, the display ranges in the near direction and the far direction can be increased. As a result, the comprehensive performance of a stereoscopic image can be improved with a simple configuration.

While in the second embodiment, the mediums 513 and 515 are arranged such that the concave surfaces thereof are opposite to each other as shown in FIGS. 12 and 13, it is not limited thereto.

Figure 14:
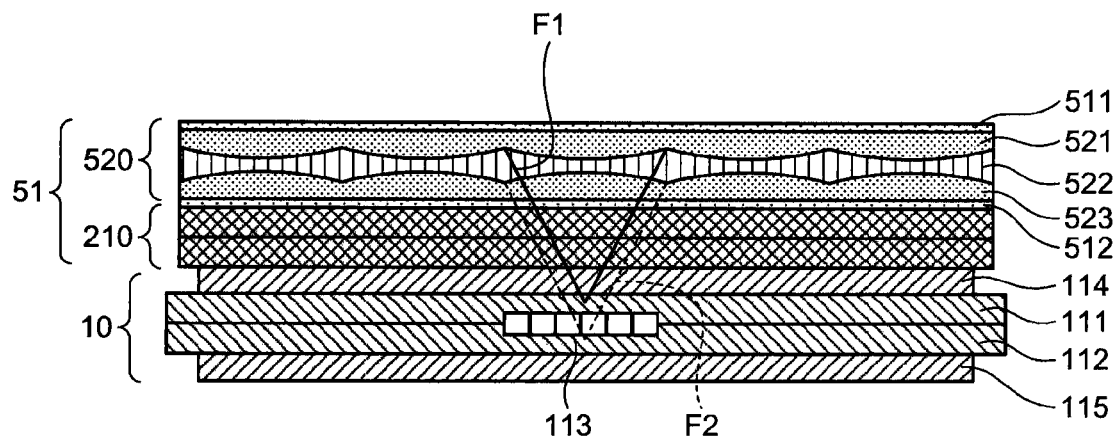
FIG. 14 is a schematic diagram illustrating a cross-section of a display unit according to a modification of the second embodiment.
Figure 15:
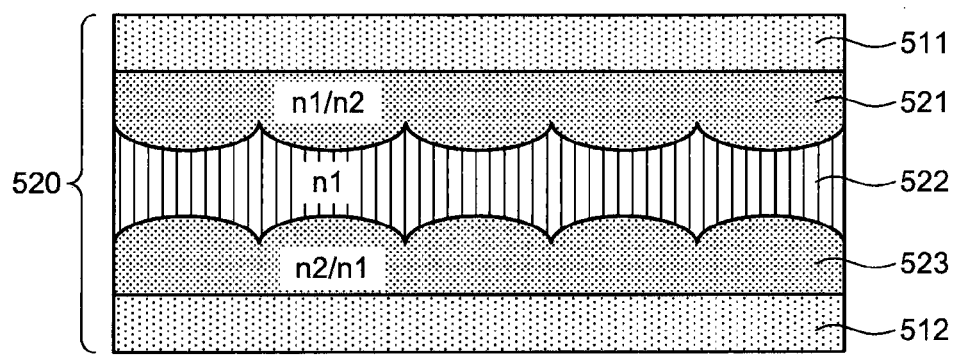
FIG. 15 is a partial enlarged view of a lens array lamination layer shown in FIG. 14.

For example, as shown in FIGS. 14 and 15, it can be configured that mediums 521 and 523 in a single convex lens form are arranged such that the convex surfaces thereof are opposite to each other. FIG. 14 is a schematic diagram illustrating a cross-section of the a display unit according to a modification of the second embodiment, and FIG. 15 is a partial enlarged view of a lens array lamination layer 520 shown in FIG. 14.

The mediums 521 and 523 are refractive-index anisotropic mediums corresponding to the mediums 513 and 515 described above, and an isotropic medium 522 having curved surfaces in a lens array is sandwiched between the mediums 521 and 523. The lens array lamination layer 520 includes the substrates 511 and 512 and the mediums 521, 522, and 523, and constitutes a lens array unit 51, which corresponds to the lens array unit 50, together with the polarization switching cell 210 described above.

As shown in FIG. 15, the mediums 521 and 523 have refractive indexes n1 and n2 (n2>n1) to polarization directions that are perpendicular to each other, and show refractive indexes different from each other to the same polarization direction. That is, the mediums 521 and 523 have a relation that refractive-index anisotropic axes thereof are orthogonal to each other. Moreover, if the refractive index of the medium 522 is n1 corresponding to the mediums 521 and 523 similarly to the above, as shown in FIG. 14, the focus directions F1 and F2 of the two lens arrays of the lens array lamination layer 520 are the direction of the elemental-image display unit 10. Since the substrates 511 and 512 are in a flat shape, it is not necessary to consider the refractive index thereof.

With such a configuration, in the lens array lamination layer 520, similarly to the lens array lamination layer 510, the lens effect of either the lens array on a side of the mediums 521 or the lens array on a side of the mediums 523 becomes effective. The two lens arrays of the lens array lamination layer 520 respectively have principal planes at different positions, but are configured to have substantially the same focus distance. The focal planes thereof are present near the front and the rear surfaces of the pixel plane 113 similarly to the above.

By configuring the display unit as described above, and by performing the switch of the lens array to be effective and the display of a stereoscopic display image by the synchronization drive unit 30 and the display control unit 40 similarly to the second embodiment, a stereoscopic image can be displayed in a state where the display range in the near and the far directions are increased. Therefore, the comprehensive performance of stereoscopic image can be improved by a simple configuration.

While in the configuration shown in FIGS. 14 and 15, the set of the refractive indexes of the refractive-index anisotropic medium (mediums 521 and 522) are the same values, n1 and n2, it is not limited thereto, and it can be configured such that the set of the refractive indexes of each refractive-index anisotropic medium are different values. As another modification of the second embodiment, a configuration example of a lens array lamination layer when a set of the refractive indexes of each refractive-index anisotropic medium are different is explained below.

Figure 16:
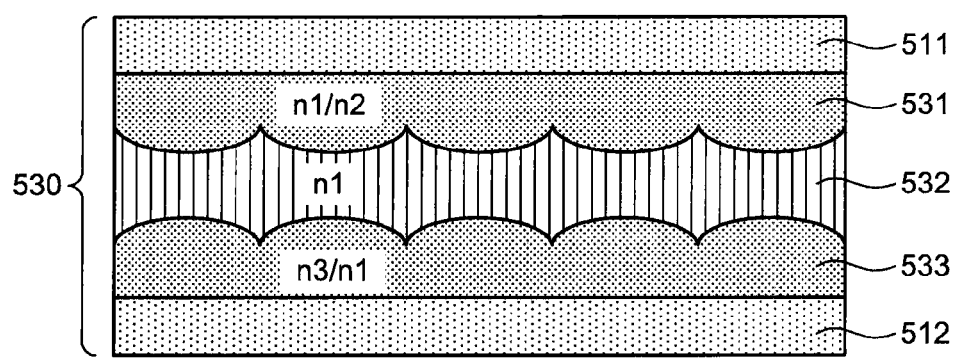
FIG. 16 is a schematic diagram illustrating a configuration of a lens array lamination layer according to another modification of the second embodiment.

FIG. 16 is a partial enlarged view of a lens array lamination layer 530 when a set of the refractive indexes of each refractive-index anisotropic medium take different values. The lens array lamination layer 530 corresponds to the lens array lamination layer 520 described above, and includes the substrates 511 and 512 and mediums 531, 532, and 533 in three layers that are filled between the substrates 511 and 512 and that contact on two interfaces forming curved surfaces of a lens. The medium 531 and 533 are refractive-index anisotropic medium whose refractive index changes corresponding to the polarization direction of incident light, and the medium 532 is an isotropic medium whose refractive index is fixed.

The mediums 531 and 533 are arranged such that the medium 532 having a curved shape in a lens array is sandwiched therebetween, and that the convex lens surfaces being the interfaces with the medium 532 are opposite to each other similarly to the configuration shown in FIGS. 14 and 15. As a difference from the configuration shown in FIGS. 14 and 15, the medium 531 has the refractive indexes n1 and n2 (n2>n1) to two polarization directions that are perpendicular to each other as the optical characteristic, and the medium 533 ahs the refractive indexes n3 and n1 (n3>n1) to two polarization directions that are perpendicular to each other as the optical characteristic. The mediums 531 and 533 show different refractive indexes from each other to the same polarization direction. Furthermore, the refractive index of the medium 532 substantially equivalent to one of the refractive indexes common for the mediums 531 and 533. If the refractive index is n1 in the structure shown in FIG. 15, similarly to the example shown in FIG. 14, the focus directions of the two lens arrays of the lens array lamination layer 530 are the direction of the elemental-image display unit 10. The two lens arrays of the lens array lamination layer 530 respectively have principal planes at different positions, but are configured to have substantially the same focus distance. The focal planes thereof are present near the front and the rear surfaces of the pixel plane 113 similarly to the above.

By configuring the display unit as described above, and by performing the switch of the lens array to be effective and the display of a stereoscopic display image by the synchronization drive unit 30 and the display control unit 40, similarly to the second embodiment, a stereoscopic image can be displayed in a state where the display range in the near and the far directions are increased. Therefore, the comprehensive performance of stereoscopic image can be improved by a simple configuration.

A third embodiment of the present invention is explained next. In the second embodiment described above, the configuration in which two lens arrays are implemented by using a lens array lamination layer formed with mediums in three layers has been explained. In the third embodiment, a configuration example in which two lens arrays are implemented by using two substrates having a predetermined refractive index together with mediums in two layers is explained. Like reference numerals or letters are denoted to like constituent elements in the above embodiments, and explanations thereof will be suitably omitted.

Figure 17:
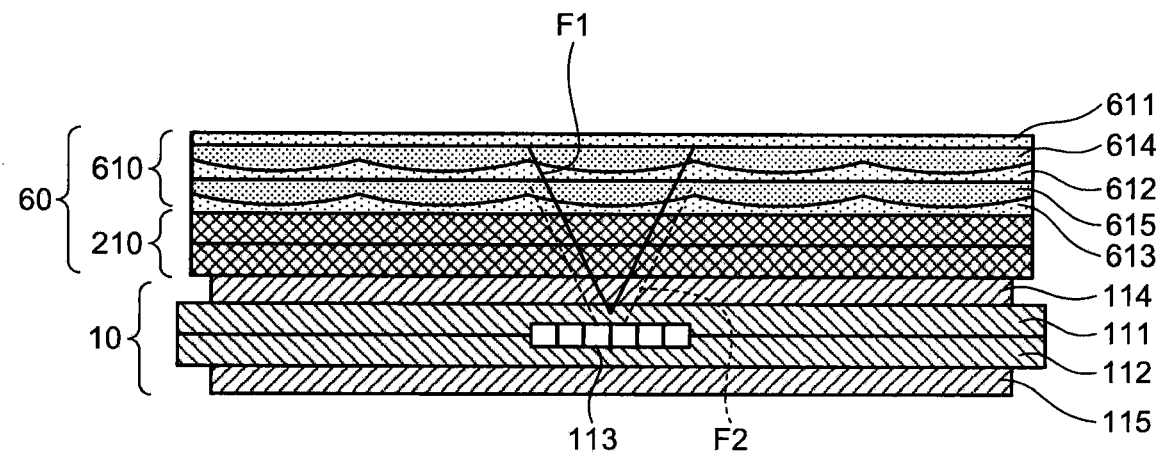
FIG. 17 is a schematic diagram illustrating a cross-section of a display unit according to a third embodiment of the present invention.

FIG. 17 is a schematic diagram illustrating a cross-section in a horizontal direction of a display unit according to the third embodiment. As shown in FIG. 17, a lens array unit 60 includes a polarization switching cell 210 and a lens array lamination layer 610. The lens array lamination layer 610 is constituted by a substrate 611 in a flat plane form, two substrates 612 and 613 having curved surfaces in a lens array, and mediums 614 and 615 in two layers that are filled between the substrates. The form of the curved surfaces of the substrates 612 and 613 can be a fly-eye lens form or a cylindrical lens form (form of lenticular sheet).

Figure 18:
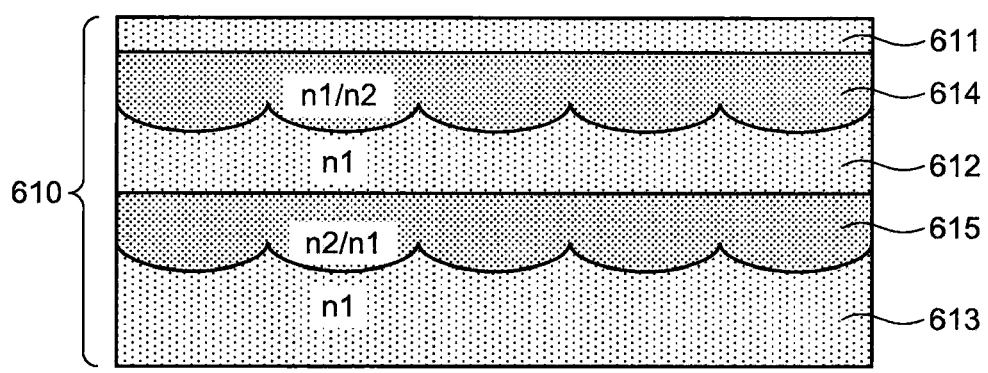
FIG. 18 is a partial enlarged view of a lens array lamination layer shown in FIG. 17.

FIG. 18 is a partial enlarged view of the lens array lamination layer 610. The medium 614 is a refractive-index anisotropic medium, and has refractive indexes n1 and n2 to two polarization directions that are perpendicular to each other as the optical characteristic. Moreover, the medium 614 forms a flat lens layer as a whole together with the substrate 612 that has substantially the same refractive index as the refractive index n1 of the medium 614 and that has a form of lens layer being an interface with the medium 614. The substrates 612 and 613 are isotropic substrates having fixed refractive index.

The medium 615 is a refractive-index anisotropic medium, and has refractive indexes n2 and n1 to two polarization directions that are perpendicular to each other as an optical characteristic. Furthermore, the medium 615 forms a flat lens layer as a whole together with the substrate 613 that has substantially the same refractive index as the refractive index n1 of the medium 615 and that has a form of lens layer being an interface with the medium 615.

The mediums 614 and 615 show refractive indexes different from each other to the same polarization direction in each layer described above. Further, the refractive indexes of the substrates 612 and 613 are substantially the same as the refractive indexes of polarization directions different from each other with respect to the mediums 614 and 615 corresponding to lens layer of each. The shape and the refractive index of the substrates 612 and 613 are determined according to the focus direction of the lens effect of the lens layer of each. Since the substrate 611 is in a flat shape, it is not necessary to consider the refractive index thereof.

With such a configuration, in the lens array lamination layer 610, either a lens array on the side of the medium 614 or a lens array on the side of the medium 615 shows lens effect corresponding to voltage applied to the polarization switching cell 210, and the focus directions F1 and F2 of each lens array is the direction of the elemental-image display unit 10 as shown in FIG. 17. The two lens arrays of the lens array lamination layer 610 respectively have principal planes at different positions, but are configured to have substantially the same focus distance similarly to the embodiments described above. The focal planes thereof are present near the front and the rear surfaces of the pixel plane 113 of the elemental-image display unit 10.

In a configuration shown in FIG. 18, the synchronization drive unit 30 alternately switches values of voltage to be applied to the polarization switching cell 210 synchronizing with each field obtained by dividing one frame of the stereoscopic display image to be displayed on the elemental-image display unit 10 into two similarly to the first embodiment, thereby alternately switching lens states of the lens array lamination layer 610, that is, a lens array to be effective. The display control unit 40 controls the elemental-image display unit 10 to display the stereoscopic display images having different depth ranges alternately by the time division multiplexing in each field, similarly to the above embodiments. The depth range of a stereoscopic display image to be displayed in each field is the range on the near side in a field in which the lens array on the near side is effective, and the range on the far side in a field in which the lens array on the far side is effective.

As described above, according to the third embodiment, the switch of effective lens array is performed synchronizing with the display timing on the elemental-image display unit 10 similarly to the above embodiments, and therefore, the range that satisfies the resolution R1 is substantially the range that is covered by the range TR21 and the range TR22 shown in FIG. 7, that is, equivalent to the range TR2. Therefore, the display range in the near direction or the far direction can be increased compared with a case that a single lens array is used, and as a result, the comprehensive performance of a stereoscopic image can be improved with a simple configuration.

While in the third embodiment, as shown in FIG. 18, the set of the refractive indexes of the refractive-index anisotropic medium (the mediums 614 and 615) are the same values, n1 and n2, it is not limited thereto, and it can be configured such that the set of the refractive indexes of each refractive-index anisotropic medium are different values. As another modification of the third embodiment, a configuration example of a lens array lamination layer when a set of the refractive indexes of each refractive-index anisotropic medium are different is explained below.

Figure 19:
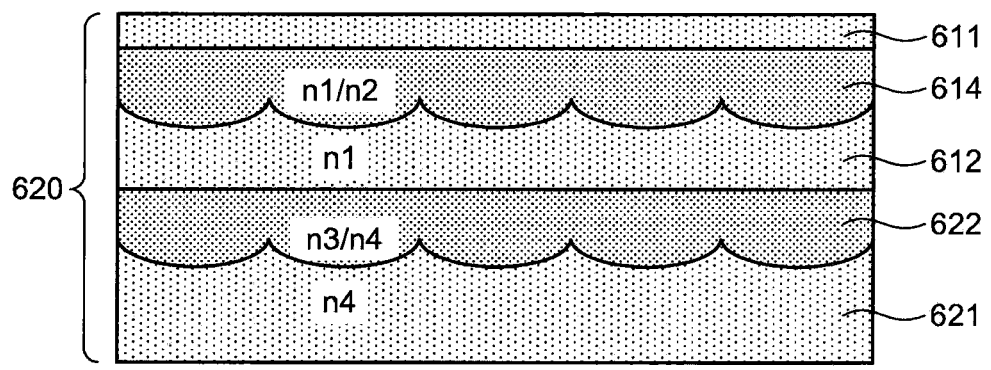
FIG. 19 is a schematic diagram illustrating a configuration of a lens array lamination layer according to a modification of the third embodiment.

FIG. 19 is a partial enlarged view of a lens array lamination layer 620 when the set of the refractive indexes of each refractive-index anisotropic medium are different values. The lens array lamination layer 620 corresponds to the lens array lamination layer 610 described above, and includes the substrates 611, 612, and 621, and mediums 614 and 622 in two layers that are filled between the substrates. The mediums 614 and 622 are refractive-index anisotropic mediums whose refractive index changes according to voltage to be applied, and the substrates 612 and 621 are isotropic substrates whose refractive index is fixed, similarly to the above.

In the example shown in FIG. 19, each set of the medium 614 and the substrate 612, and of the medium 622 and the substrate 621 forms a flat lens layer as a whole. As a difference from the configuration shown in FIGS. 17 and 18, the medium 622 has refractive indexes n3 and n4 (n3>n4) to two polarization directions that are perpendicular to each other, and the substrate 621 has the refractive index n4. Therefore, to the same polarization direction, the mediums 614 and 622 show the refractive indexes n1 and n3, respectively, or the refractive indexes n2 and n4, respectively.

With such a configuration, in the lens array lamination layer 620, the refractive indexes of the mediums 614 and 622 are switched corresponding to the polarization direction of incident light from the polarization switching cell 210. Thus, either a lens array on the side of the medium 614 or a lens array on the side of the medium 622 shows lens effect, and the focus directions of each lens array is the direction of the elemental-image display unit 10 similarly to the focus direction shown in FIG. 17. The two lens arrays of the lens array lamination layer 620 respectively have principal planes at different positions, but are configured to have substantially the same focus distance. The focal planes thereof are present near the front and the rear surfaces of the pixel plane 113.

By configuring the display unit as described above, similarly to the third embodiment, and by performing the switch of the lens array to be effective and the display of a stereoscopic display image by the synchronization drive unit 30 and the display control unit 40, the display range in the near and the far directions can be increased. Therefore, the comprehensive performance of stereoscopic image can be improved by a simple configuration.

A fourth embodiment of the present invention is explained next. In the fourth embodiment, a configuration example in which an anisotropic gradient index (GRIN) lens that has refractive-index anisotropic property and refractive index distribution is used as a medium is explained. Like reference numerals or letters are denoted to like constituent elements in the above embodiments, and explanations thereof will be suitably omitted.

Figure 20:
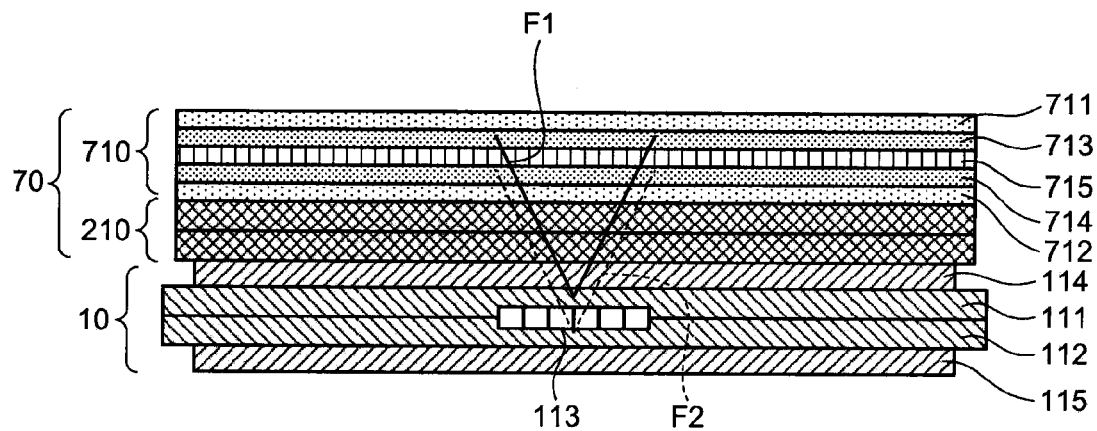
FIG. 20 is a schematic diagram illustrating a cross-section of a display unit according to a fourth embodiment of the present invention.

FIG. 20 is a schematic diagram illustrating a cross-section in a horizontal direction of a display unit according to the fourth embodiment. As shown in FIG. 20, the display unit includes the elemental-image display unit 10 and a lens array unit 70. The lens array unit 70 includes a lens array lamination layer 710 and the polarization switching cell 210. The lens array lamination layer 710 is constituted of substrates 711 and 712, anisotropic GRIN lens layers 713 and 714 in a flat shape, and an intermediate separation layer 715 that separates the GRIN lens layers 713 and 714. The refractive index distribution of the GRIN lens layers 713 and 714 includes a refractive index distribution of a lens array. This distribution form can be a fly-eye lens form or a cylindrical lens form (form of lenticular sheet).

Figure 21:
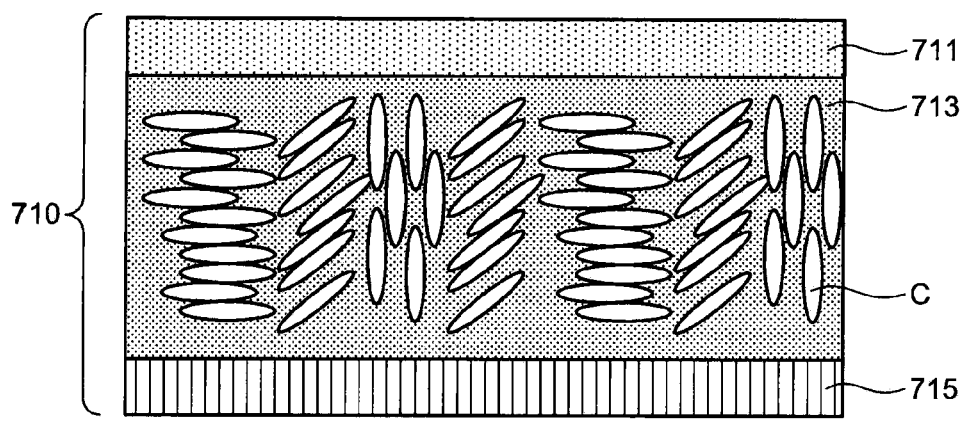
FIG. 21 is a partial enlarged view of a lens array lamination layer shown in FIG. 20.

The GRIN lens layers 713 and 714 are made from, for example, a liquid crystal material C in an alignment state as shown in FIG. 21, and has refractive index distribution corresponding to the alignment direction of this liquid crystal material C. The directions in which the GRIN lens layers 713 and 714 have the refractive index distribution are same, and the polarization directions indicating the refractive index distribution are perpendicular to each other. That is, in one of the GRIN lens layers, liquid crystal molecules are laid on a surface of a paper sheet as shown in FIG. 21 and the orientation thereof changes in the horizontal direction of the paper sheet. In the other one of the GRIN lens layers, the liquid crystal molecules shown in FIG. 21 are laid on a plane perpendicular to the surface of the paper sheet and the orientation thereof changes in the horizontal direction of the paper sheet (rotating within a vertical plane). In the GRIN lens layers 713 and 714, the lens effect by the refractive index distribution, that is, effectiveness/ineffectiveness of a lens array is switched corresponding to the polarization direction of incident light. As shown in FIG. 20, it is configured such that the focus directions F1 and F2 by the refractive index distribution of the GRIN lens layers 713 and 714 are the direction of the elemental-image display unit 10. Since the substrates 711 and 712, and the intermediate separation layer 715 are in a flat shape, it is not necessary to consider the refractive index thereof.

In the configuration shown in FIGS. 20 and 21, the synchronization drive unit 30 applies voltage to the polarization switching cell 210 in a state where phases of a voltage waveform are shifted by 1 field from each other. With such a configuration, the refractive indexes of the GRIN lens array lamination layers 713 and 714 are switched corresponding to the voltage applied to the polarization switching cell 210, and as a result, the lens effect of either the lens array on a side of the GRIN lens layer 713 or the lens array on a side of the GRIN lens layer 714 becomes effective. The two lens arrays of the lens array lamination layer 710 respectively have principal planes at different positions, but are configured to have substantially the same focus distance. The focal planes thereof are present near the front and the rear surfaces of the pixel plane 113 of the elemental-image display unit 10.

Moreover, similarly to the first embodiment described above, the display control unit 40 controls the elemental-image display unit 10 to display the stereoscopic display images having different depth ranges by the time division multiplexing in each field. The depth range of a stereoscopic display image to be displayed in each field is the range on the near side in a field in which the lens array on the near side is effective, and the range on the far side in a field in which the lens array on the far side is effective.

In this way, since the switch of effective lens array is performed synchronizing with the display timing on the elemental-image display unit 10, similarly to the first embodiment, a stereoscopic image can be displayed while the display range in the near direction or the far direction is increased compared with a case that a single lens array is used.

As described above, in the fourth embodiment, two lens arrays having different focal planes are implemented by using the anisotropic GRIN lens, and images in different near or far directions are alternately displayed on the elemental-image display unit by the time division multiplexing synchronized with the switching timing of the lens arrays. Thus, the display range in the near direction and the far direction can be increased, and as a result, the comprehensive performance of a stereoscopic image can be improved with a simple configuration.

A fifth embodiment of the present invention is explained next. In each of the embodiments described above, a configuration in which two lens arrays are implemented by switching the polarization state of incident light to a lens array lamination layer by application of voltage to the polarization switching cell 210 has been explained. In the fifth embodiment, a configuration example in which switch of lens effect of a lens array lamination layer is performed by means other than the polarization switching cell 210 is explained.

Figure 22:
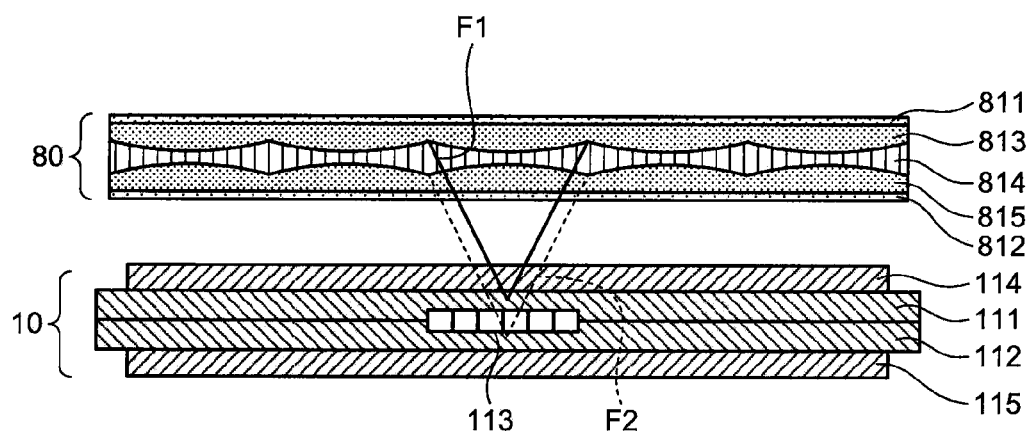
FIG. 22 is a schematic diagram illustrating a cross-section of a display unit according to a fifth embodiment of the present invention.

FIG. 22 is a schematic diagram illustrating a cross-section in the horizontal direction of a display unit according to the fifth embodiment. As shown in FIG. 22, the display unit includes the elemental-image display unit 10 and a lens array unit 80. The lens array unit 80 includes substrates 811 and 812, and mediums 813, 814, and 815 in three layers that are filled between the substrates and contact on two interfaces forming curved surfaces of a lens. The form of the curved surfaces of the lens can be a fly-eye lens form or a cylindrical lens form (form of lenticular sheet).

Figure 23:
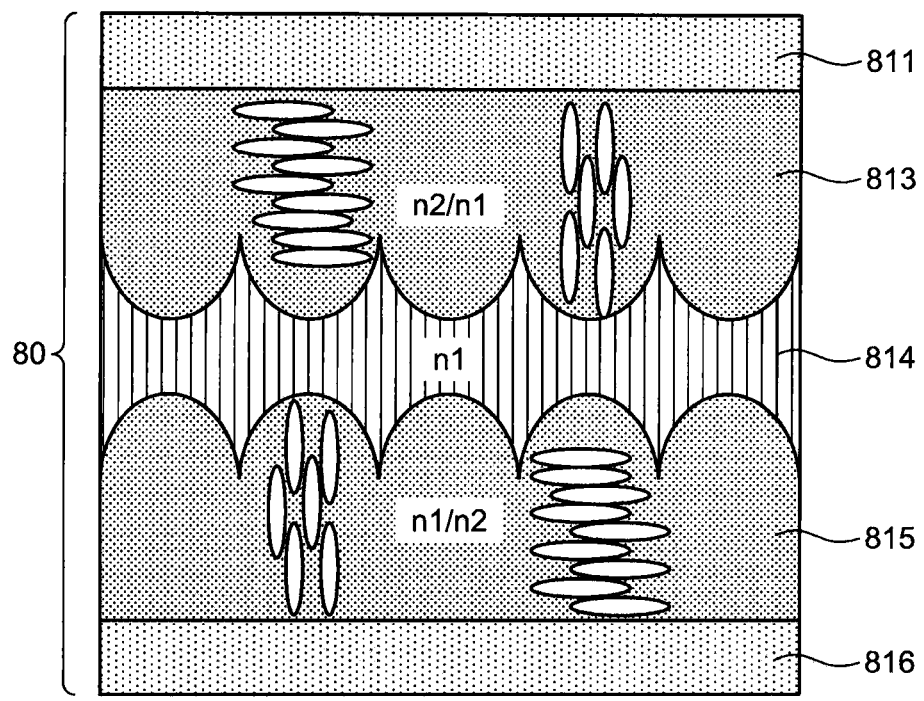
FIG. 23 is a partial enlarged view of a lens array lamination layer shown in FIG. 22.

FIG. 23 is a partial enlarged view of the lens array unit 80. As shown in FIG. 23, the mediums 813 and 815 are arranged such that convex lens surfaces are opposite to each other, and the medium 814 is held between the mediums 813 and 815. The mediums 813 and 815 are liquid crystal lenses, and alignment of liquid crystals there of are changed corresponding to voltage applied from electrodes (not shown) patterned respectively on four interfaces of the substrates 811 to 812. A part or the entirety of the electrodes is formed with a transparent electrode. The medium 814 is an isotropic intermediate separation layer.

Specifically, the mediums 813 and 815 change the liquid crystal alignment to two states as shown in FIG. 2, that is, two states of the refractive indexes n1 and n2 (n2>n1). The medium 814 has a refractive index substantially the same as one of refractive indexes common for the mediums 813 and 815. In the configuration shown in FIG. 23, the medium 814 has the refractive index n1. As described above, the medium 814 has a refractive index substantially the same as one of the refractive indexes common for the mediums 813 and 815. The shape and the refractive index of the medium 814 are determined according to the focus direction of the lens effect of the lens array unit 80. Since the substrates 811 and 816 are in a flat shape, it is not necessary to consider the refractive index thereof.

In the configuration described above, the synchronization drive unit 30 applies voltage to each of the mediums 813 and 815 in a state where phases of a voltage waveform are shifted by 1 field from each other, through the electrodes of the lens array unit 80. With such a configuration, in the lens array unit 80, the lens effect of either the lens array on a side of the medium 813 or the lens array on a side of the medium 815 becomes effective corresponding to the voltage applied from the synchronization drive unit 30.

Thus, as shown in FIG. 22, the focus directions F1 and F2 of the two lens arrays of the lens array unit 80 are the direction of the elemental-image display unit 10. The two lens arrays of the lens array unit 80 respectively have principal planes at different positions, but are configured to have substantially the same focus distance. The focal planes thereof are present near the front and the rear surfaces of the pixel plane 113. It can be configured such that the voltage is applied directly by the synchronization drive unit 30 to the electrodes of the lens array unit 80, or by controlling another device such as a voltage applying device to apply voltage to the electrodes from the device.

The display control unit 40 controls the elemental-image display unit 10 to display the stereoscopic display images having different depth ranges alternately by the time division multiplexing in each field. The depth range of a stereoscopic display image to be displayed in each field is the range on the near side in a field in which the lens array on the near side is effective, and the range on the far side in a field in which the lens array on the far side is effective.

As described above, in the fifth embodiment, two lens arrays are implemented by using liquid crystal lenses having different focal planes, and images on the near or far side are alternately displayed on the elemental-image display unit by time division multiplexing synchronized with the lens array switching timing. Thus, the display ranges in the near direction and the far direction can be increased. As a result, the comprehensive performance of a stereoscopic image can be improved with a simple configuration.

While in the fifth embodiment, the liquid crystal mediums 813 and 815 in a single convex lens form are arranged such that the convex surfaces thereof are opposite to each other as shown in FIGS. 22 and 23, it is not limited thereto.

Figure 24:
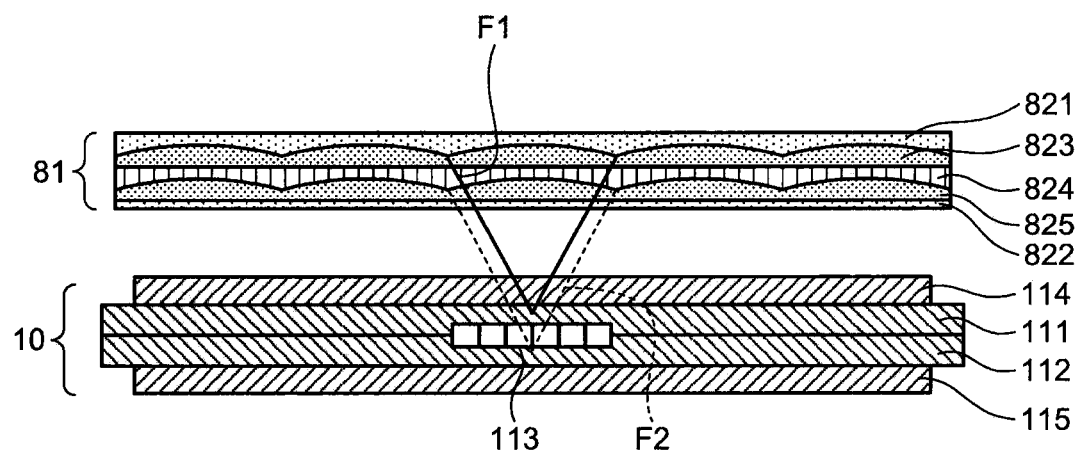
FIG. 24 is a schematic diagram illustrating a cross-section of a display unit according to a modification of the fifth embodiment.

For example, as shown in FIG. 24, it can be configured that mediums 823 and 825 in a single convex lens form corresponding to the mediums 813 and 815 are arranged such that the concave surfaces thereof face an opposite direction (upward in the drawing) to the elemental-image display unit 10. FIG. 24 is a schematic diagram illustrating a cross-section in the horizontal direction of a display unit according to a modification of the fifth embodiment.

In the example shown in FIG. 24, a lens array unit 81 is a beam controller corresponding to the lens array unit 80 described above, and includes substrates 821 and 822, and mediums 823, 824, and 825. The medium 824 is an isotropic intermediate separation layer corresponding to the medium 814 described above, and is held between the mediums 823 and 825.

It is assumed that the refractive indexes of the mediums 823 and 825 in two states are n1/n2 (n2>n1) and the refractive index of the medium 824 corresponding to the intermediate separation layer is n1. Further, as shown in FIG. 24, it is assumed that the focus directions F1 and F2 of two lens arrays of the lens array unit 81 are toward the elemental-image display unit 10, and the focal plane thereof is present near the front and the rear surfaces of the pixel plane 113.

By configuring the display unit as described above, similarly to the fifth embodiment, and by performing the switch of the lens array to be effective and the display of a stereoscopic display image by the synchronization drive unit 30 and the display control unit 40, the display range in the near and the far directions are increased. Therefore, the comprehensive performance of stereoscopic image can be improved by a simple configuration.

While exemplary embodiments of the present invention have been explained above, the invention is not limited thereto, and various modifications, substitutions, and additions can be made without departing from the scope of the invention. Furthermore, various inventions can be created by combinations of the constituent elements disclosed in the above embodiments. For example, some of the whole constituent elements disclosed in the embodiments can be omitted. Further, the constituent elements according to different embodiments can be suitably combined with each other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stereoscopic-image display apparatus comprising:
   an elemental-image display unit that includes pixel plane on which pixels are arranged in matrix;
   a polarization switching cell that is arranged opposite to the elemental-image display unit, and that switches polarization direction thereof corresponding to applied voltage;
   a lens array lamination layer that includes refractive-index anisotropic mediums and substrates with two lens arrays whose principal planes are different from each other, the refractive-index anisotropic mediums making lens effect of either one of the lens arrays effective corresponding to the polarization direction switched by the polarization switching cell;
   a synchronization drive unit that controls voltage to be applied to the polarization switching cell synchronizing with a display timing of images displayed on the elemental-image display unit, and that switches the lens array to be effective at each display timing; and
   a display control unit that controls the elemental-image display unit to alternately display the images on near or far sides by time division multiplexing, synchronizing with the display timing, wherein
   focal planes of the two lens arrays are positioned at different positions from each other near the pixel plane.

2. The apparatus according to claim 1, wherein out of the two lens arrays, the focal plane of one of the lens arrays is positioned near a front surface of the pixel plane, and the focal plane of the other lens arrays is positioned near a rear surface of the pixel plane.

3. The apparatus according to claim 1, wherein
the synchronization drive unit controls voltage to be applied to the polarization switching cell, synchronizing with each field that is obtained by dividing one frame of an image to be displayed on the elemental-image display unit into two, and
the display control unit alternately displays the images on the near or far sides by time division multiplexing, synchronizing with each field.

4. The apparatus according to claim 1, wherein the lens array lamination layer includes
the mediums having refractive indexes different from each other with respect to two different polarization directions, and
the two substrates that sandwiches the mediums therebetween, and that are formed with lens arrays having refractive indexes substantially same as the two respective refractive indexes of the mediums.

5. The apparatus according to claim 1, wherein the lens array lamination layer includes
the two mediums that respectively have refractive indexes different from each other with respect to two different polarization directions, wherein at least one of the refractive indexes is substantially same and refractive indexes to an identical polarization direction are different from each other, and
the substrates are sandwiched between the two mediums, and that have refractive index substantially same as one of refractive indexes common for the two mediums.

6. The apparatus according to claim 1, wherein
the lens array lamination layer includes two lens layers each of which is formed with mediums having refractive indexes different from each other with respect to two different polarization directions and the substrates in a form of a lens array serving as an interface with the medium, the lens layers being flat as a whole, and
in each of the lens layers, the respective mediums have different refractive indexes from each other with respect to an identical polarization direction, and the respective substrates have substantially same refractive indexes with refractive indexes of different polarization directions of the mediums corresponding to the lens layer thereof.

7. The apparatus according to claim 1, wherein the lens array lamination layer includes
a first refractive-index-anisotropic gradient index (GRIN) lens that has refractive index distributions different from each other with respect to a polarization direction;
a second refractive-index-anisotropic GRIN lens that has refractive index distributions different from each other with respect to a polarization direction, and that the polarization direction with which the refractive index distribution is shown is different from that of the first refractive-index-anisotropic GRIN lens; and
an intermediate separation layer that is arranged between the first refractive-index-anisotropic GRIN lens and the second refractive-index-anisotropic GRIN lens.

8. A stereoscopic-image display apparatus comprising:
an elemental-image display unit that includes pixel plane on which pixels are arranged in matrix;
a first medium formed in two layers that is arranged opposite to the elemental-image display unit, the layers includes substrates with two lens arrays whose principal planes are different from each other, and the layers switches refractive index thereof corresponding to applied voltage;
a second medium having isotropy that is arranged between layers of the first medium;
a synchronization drive unit that controls voltage to be applied to the first medium synchronizing with a display timing of images displayed on the elemental-image display unit, and that switches the lens array to be effective at each display timing; and
a display control unit that controls the elemental-image display unit to alternately display the images on near or far sides by time division multiplexing, synchronizing with the display timing, wherein
focal planes of each layer of the first medium are positioned at different positions from each other near the pixel plane.

* * * * *

UNITED STATES PATENT AND TRADEMARK OFFICE
CERTIFICATE OF CORRECTION

PATENT NO. : 7,830,579 B2  
APPLICATION NO. : 12/405477  
DATED : November 9, 2010  
INVENTOR(S) : Saishu et al.

Page 1 of 1

It is certified that error appears in the above-identified patent and that said Letters Patent is hereby corrected as shown below:

Title page, Item (57), in the Abstract, line 3, change "that switches" to --that switch--.

Claim 4, column 19, line 18, change "sandwiches" to --sandwich--.

Claim 8, column 20, line 24, change "includes" to --include--.

Claim 8, column 20, line 26, change "switches" to --switch--.

Signed and Sealed this  
Eighth Day of March, 2011

David J. Kappos  
*Director of the United States Patent and Trademark Office*